United States Patent
Nobukawa et al.

(10) Patent No.: US 8,697,600 B2
(45) Date of Patent: Apr. 15, 2014

(54) EXHAUST GAS PURIFYING CATALYST

(75) Inventors: Takeshi Nobukawa, Susono (JP); Oji Kuno, Susono (JP); Akira Morikawa, Nagoya (JP); Kae Yamamura, Nagoya (JP); Naoki Takahashi, Nagoya (JP); Akihiko Suda, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 283 days.

(21) Appl. No.: 13/188,893

(22) Filed: Jul. 22, 2011

(65) Prior Publication Data
US 2012/0021899 A1 Jan. 26, 2012

(30) Foreign Application Priority Data
Jul. 23, 2010 (JP) ................................. 2010-166101

(51) Int. Cl.
B01J 23/00 (2006.01)
B01J 21/00 (2006.01)
B01J 20/00 (2006.01)

(52) U.S. Cl.
USPC ........... 502/327; 502/302; 502/303; 502/304; 502/332; 502/333; 502/334; 502/339; 502/355; 502/415; 502/439; 502/527.12; 502/527.13

(58) Field of Classification Search
USPC ......... 502/302–304, 327, 332–334, 339, 355, 502/415, 439, 527.12, 527.13
See application file for complete search history.

(56) References Cited

U.S. PATENT DOCUMENTS

| 5,958,827 | A  | * | 9/1999  | Suda et al. ...................... 502/304 |
| 6,326,329 | B1 | * | 12/2001 | Nunan ............................ 502/242 |
| 6,492,297 | B1 | * | 12/2002 | Sung ............................. 502/304 |
| 6,528,451 | B2 | * | 3/2003  | Brezny et al. .................. 502/304 |
| 6,585,944 | B1 | * | 7/2003  | Nunan et al. ................ 423/239.1 |
| 7,214,643 | B2 | * | 5/2007  | Yamamoto et al. ............ 502/300 |
| 7,247,597 | B2 | * | 7/2007  | Morikawa et al. ............. 502/304 |
| 7,384,888 | B2 | * | 6/2008  | Kuno ............................. 502/326 |
| 8,202,819 | B2 | * | 6/2012  | Kohara et al. .................. 502/304 |
| 2002/0049137 | A1 | * | 4/2002 | Morikawa et al. ............. 502/351 |
| 2003/0083194 | A1 | * | 5/2003 | Sung ............................. 502/304 |
| 2012/0172212 | A1 | * | 7/2012 | Yue et al. ....................... 502/304 |

FOREIGN PATENT DOCUMENTS

| JP | 7-080311 A | 3/1995 |
| JP | 2007-117848 A | 5/2007 |
| JP | 2007-247968 A | 9/2007 |
| JP | 2008-062130 A | 3/2008 |
| JP | 2009-019537 A | 1/2009 |

(Continued)

OTHER PUBLICATIONS

Toshiyuki Masui et al.: "Reduction Behavior of $CeO_2$-$ZrO_2$ Solid Solution Prepared from Cerium Zirconyl Oxalate", Chem. Mater. 1998, 10, pp. 4005-4009.

(Continued)

*Primary Examiner* — Cam N. Nguyen
(74) *Attorney, Agent, or Firm* — Sughrue Mion, PLLC

(57) ABSTRACT

An exhaust gas purifying catalyst that contains a first oxygen storage material on which no noble metal is supported and which has a pyrochlore phase type regular array structure, and a second oxygen storage material which has a higher oxygen storage rate and a lower oxygen storage capacity than the first oxygen storage material and on which a platinum group noble metal is supported.

11 Claims, 5 Drawing Sheets

(56) References Cited

FOREIGN PATENT DOCUMENTS

| JP | 2009-084061 A | 4/2009 |
|---|---|---|
| WO | 2006/030763 A1 | 3/2006 |
| WO | 2008/093471 A1 | 8/2008 |
| WO | 2010/064497 A1 | 6/2010 |

OTHER PUBLICATIONS

Haruo Kishimoto et al.: "Crystal structure of metastable k-CeZrO$_4$ phase possessing an ordered arrangement of Ce and Zr ions", Journal of Alloys and Compounds 312 (2000), pp. 94-103.

Akihiko Suda et al.: "Improvement of Oxygen Storage Capacity of CeO$_2$-ZrO$_2$ Solid Solution by Heat Treatment in Reducing Atmosphere", Journal of the Ceramic Society of Japan 110 [2], pp. 126-130 (2002).

Tsuyoshi Sasaki et al.: "Flaming Oxidation of Reduced CeO$_2$-ZrO$_2$ Solid Solution in the Near-Room-Temperature Range", Journal of the Ceramic Society of Japan 110 [10], pp. 899-903 (2002).

Tsuyoshi Sasaki et al.: "Oxygen Absorption Behavior of Ce$_2$Zr$_2$O$_{7+x}$ and Formation of Ce$_2$Zr$_2$O$_{7.5}$", Journal of the Ceramic Society of Japan 111 [6], pp. 382-385 (2003).

Japanese Office Action for corresponding JP Patent Application No. 2010-166101 issued on Jul. 24, 2012.

\* cited by examiner

EXHAUST GAS PURIFYING CATALYST

INCORPORATION BY REFERENCE

The disclosure of Japanese Patent Application No. 2010-166101 filed on Jul. 23, 2010, including the specification, drawings and abstract is incorporated herein by reference in its entirety.

BACKGROUND OF THE INVENTION

1. Field of Invention

The present invention relates to an exhaust gas purifying catalyst. More specifically, the present invention relates to an exhaust gas purifying catalyst in which two different oxygen storage materials are used in a specific combination to achieve a high level of $NO_X$ purification performance. The term "oxygen storage capacity" is hereinafter occasionally abbreviated to "OSC". The term "high level of $NO_X$ purification performance" used herein means that a level of $NO_X$ purification performance is equal to or higher than those of exhaust gas purifying catalysts according to related arts.

2. Description of Related Art

Exhaust gas that is discharged from an internal combustion engine of an automobile or the like contains HC (hydrocarbons), CO (carbon monoxide) and $NO_X$ (nitrogen oxides), and these substances are emitted into the atmosphere after being purified by an exhaust gas purifying catalyst. As a typical example of the exhaust gas purifying catalyst that is used for this purpose, a three-way catalyst that is composed of a porous oxide carrier such as alumina ($Al_2O_3$), silica ($SiO_2$), zirconia ($ZrO_2$) or titania ($TiO_2$), and a noble metal, such as platinum (Pt), rhodium (Rh) or palladium (Pd), that is supported on the carrier is known.

The three-way catalyst, which can purify HC and CO in the exhaust gas by oxidation and also purify $NO_X$ by reduction, produces the highest effect in a stoichiometric exhaust gas atmosphere from combustion at an air fuel ratio that is close to the theoretical air-fuel ratio. Improvement of the fuel efficiency leads to an increase in the opportunities for an exhaust gas purifying catalyst to be exposed to sudden fluctuations of atmosphere due to A/F fluctuations at a high temperature that are caused by, for example, an increase of the number of times of fuel cut (FC) at a high temperature. Such sudden fluctuations of atmosphere can significantly accelerate deterioration of the catalyst.

The A/F of the gas into an exhaust gas purifying catalyst can fluctuate significantly depending on the driving conditions such as acceleration and deceleration. In such a case, an oxygen sensor that is located on the side of the exhaust gas purifying catalyst performs a control function to adjust the inside of the catalyst to a stoichiometric state. In this case, the catalyst is required to have a high OSC rate to absorb the A/F fluctuations during transitions. On the other hand, because there are running ranges in which the vehicle speed is not changed so drastically when the vehicle is driven in a drive mode, the catalyst is also required to exhibits its OSC capacity for a long period of time in a situation where the A/F of the gas into the catalyst does not fluctuate so drastically.

In addition, reduction of sulfur components that are contained in fuels, such as gasoline and kerosene, is in progress, but it is impossible to remove sulfur components completely and it is unavoidable for a small amount of sulfur components to remain in the fuels. The sulfur components in the fuels deteriorate the performance of the exhaust gas purifying catalyst. Thus, an exhaust gas purifying catalyst that can maintain its catalytic performance under various conditions is desired.

In addition, because the noble metals that are used in exhaust gas purifying catalysts are expensive and limited as natural resources, it is necessary to use less noble metals. Thus, various techniques are used to improve the activity of exhaust gas purifying catalysts.

For example, Japanese Patent Application Publication No. 2008-62130 (JP-A-2008-62130) discloses an exhaust gas purifying catalyst. This catalyst contains an oxygen occluding material that is obtained by mixing first cerium-based oxygen occluding material particles (A) which have a first number average particle size and second cerium-based oxygen occluding material particles (B) which have the same composition as the particles (A) and a second number average particle size which is greater than the first number average particle size. A deterioration time of an oxygen occlusion/release capacity is adjusted to a predetermined length. As a specific example of the catalyst, an exhaust gas purifying catalyst that contains an oxygen occluding material mixture that is obtained by mixing two different types of cerium-based oxygen occluding material particles on which Rh is supported and a Pd-supporting alumina powder is shown.

Japanese Patent Application Publication No. 2009-19537 (JP-A-2009-19537) also discloses an exhaust gas purifying catalyst. This catalyst has an upstream catalyst part that contains a Pd/alumina which is composed of Pd-supporting alumina particles and an Rh/OSC which is composed of Rh-supporting oxygen occluding material particles, and a downstream catalyst part that contains a Pt/alumina which is composed of Pt-supporting alumina particles and an Rh/OSC that is composed of Rh-supporting oxygen occluding material particles. With this arrangement, the mass ratio $ZrO_2/CeO_2$ of the oxygen occluding material particles in the upstream catalyst part is greater than the mass ratio $ZrO_2/CeO_2$ of the oxygen occluding material particles in the downstream catalyst part. In this catalyst, the oxygen occluding material particles in the upstream catalyst part are highly responsive in occluding and releasing oxygen and have a high oxygen occlusion/release rate, and the oxygen occluding material particles in the downstream catalyst part occludes and releases a large amount of oxygen.

Japanese Patent Application Publication No. 2009-84061 (JP-A-2009-84061) discloses a pyrochlore phase type ceria-zirconia composite oxide in which 50% or more of the pyrochlore phase type regularly-arrayed phase that exists before heating remains in the ceria-zirconia composite oxide even after heating at a temperature of 1000° C. or higher in the atmosphere. In addition, Japanese Patent Application Publication No. 2007-247968 (JP-A-2007-247968) discloses a catalyst material that is composed of particles of two different types of metal oxides including at least one of $CeO_2$, $ZrO_2$, $Al_2O_3$, $TiO_2$, $SiO_2$, MgO, $Y_2O_3$ and $LaO_3$ on which a noble metal is supported.

However, any of the above-mentioned exhaust gas purifying catalysts does not have satisfactory $NO_X$ purification performance after endurance and therefore an exhaust gas purifying catalyst that has higher $NO_X$ purification performance is desired.

SUMMARY OF THE INVENTION

The present invention provides an exhaust gas purifying catalyst that has high $NO_X$ purification performance after endurance.

The present inventors conducted earnest studies to accomplish the object and, consequently, found the following fact. In the exhaust gas purifying catalysts according to the related arts in which the OSC reaction rate is controlled by changing the Ce/Zr molar ratio or specific surface area of the OSC material (such as ceria-zirconia solid solution) or by increasing the amount of noble metal supported, the OSC capacity decreases and the OSC does not last for a long period of time when the Ce/Zr molar ratio is decreased, to increase the OSC reaction rate, and the supported noble metal tends to undergo grain growth which leads to a decrease in the purification performance when the specific surface area is decreased, for example. In other words, it is difficult to realize high $NO_X$ purification performance after endurance using less noble metals by controlling the OSC reaction rate through control of the above parameters. The present inventors conducted additional studies and, consequently, accomplished the present invention.

A first aspect of the present invention relates to an exhaust gas purifying catalyst. The exhaust gas purifying catalyst contains a first oxygen storage material on which no noble metal is supported and which has a pyrochlore phase type regular array structure, and a second oxygen storage material which has a higher oxygen storage rate and a lower oxygen storage capacity than the first oxygen storage material, and a platinum group noble metal is supported on the second oxygen storage material. In this catalyst, the oxygen storage material which has a pyrochlore phase type regular array structure means an oxygen storage material in which a pyrochlore phase type regular array structure is formed and which has a characteristic value peculiar to a pyrochlore phase type regular array structure which is determined by a measurement method that is described in the section of Examples below and which remains generally unchanged even after the oxygen storage material is heated at a temperature of 1000° C. for five hours in the atmosphere.

A second aspect of the present invention relates to an exhaust gas purifying catalyst. The catalyst has a catalyst layer. The catalyst layer contains a first oxygen storage material on which no noble metal is supported and which has a pyrochlore phase type regular array structure, and a second oxygen storage material which has a higher oxygen storage rate and a lower oxygen storage capacity than the first oxygen storage material and on which a platinum group noble metal is supported.

According to the present invention, it is possible to obtain an exhaust gas purifying catalyst which has high $NO_X$ purification performance after endurance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

According to the exhaust gas purifying catalyst according to the present invention, which that contains a first oxygen storage material on which no noble metal is supported and which has a pyrochlore phase type regular array structure, and a second oxygen storage material which has a higher oxygen storage rate and a lower oxygen storage capacity than the first oxygen storage material and on which a platinum group noble metal is supported, the $NO_X$ conversion efficiency after an endurance test, which is obtained by a measurement method that is described in the section of Examples below, can be higher than those of exhaust gas purifying catalysts according to related arts.

In particular, the automotive exhaust gas purifying catalyst of the present invention includes the following embodiments: 1) The exhaust gas purifying catalyst, in which the proportion of the first oxygen storage material to the total of the oxygen storage materials is greater than 4.5% by mass and not greater than 77% by mass. 2) The exhaust gas purifying catalyst according to the embodiment 1), in which the second oxygen storage material has a Ce/Zr composition ratio (molar ratio) in the range of 1/9 to 9/1. 3) The exhaust gas purifying catalyst according to the embodiment 1), in which the first oxygen storage material is present in the same coat layer as the second oxygen storage material on which a noble metal is supported. 4) The exhaust gas purifying catalyst, in which the proportion of the first oxygen storage material to the total of the oxygen storage materials is greater than 9% by mass and not greater than 67% by mass. 5) The exhaust gas purifying catalyst according to the embodiment 4), in which the first oxygen storage material is present in the same coat layer as the second oxygen storage material on which a noble metal is supported. 6) The exhaust gas purifying catalyst according to the embodiment 4), in which the second oxygen storage material on which a noble metal is supported is present in a region that is closer to the surface of a coat layer than the first oxygen storage material. 7) The exhaust gas purifying catalyst, in which the platinum group noble metal is Pt or Pd. 8) The exhaust gas purifying catalyst, which further contains an alumina ($Al_2O_3$) on which no noble metal is supported. 9) The exhaust gas purifying catalyst, which further includes an Rh coat layer that covers a catalyst layer which contains the first oxygen storage material and the second oxygen storage material.

Figure 1:
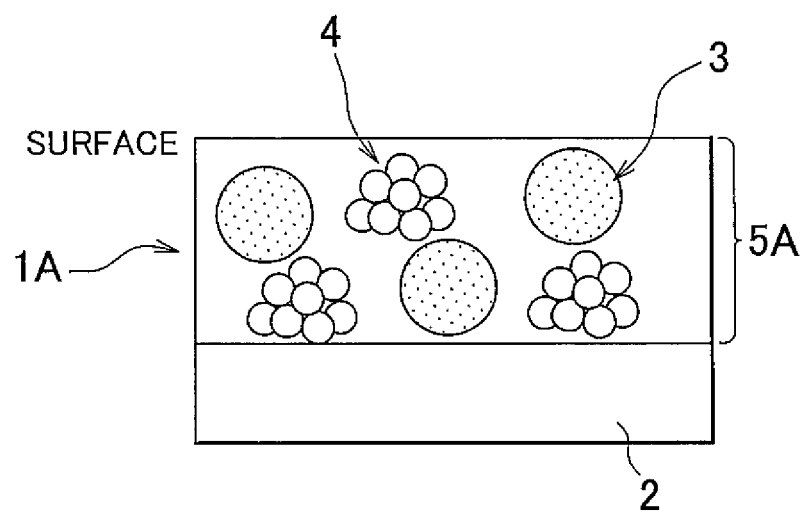
FIG. 1 is a partially enlarged cross-sectional schematic view of an exhaust gas purifying catalyst according to a first embodiment of the present invention.
Figure 2:
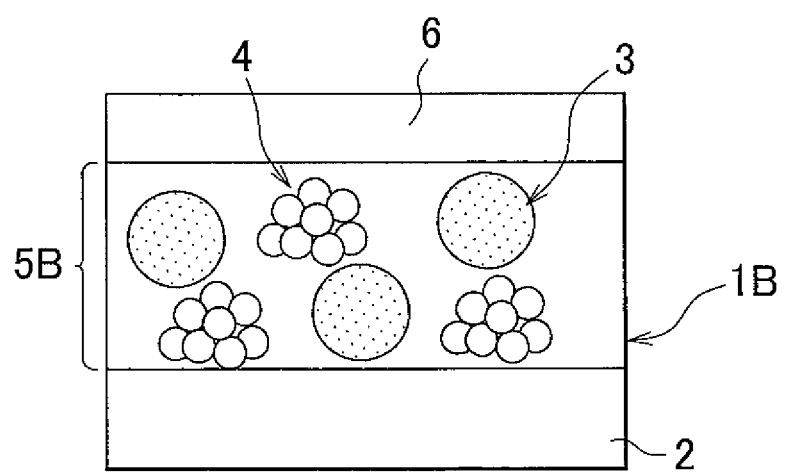
FIG. 2 is a partially enlarged cross-sectional schematic view of an exhaust gas purifying catalyst according to a second embodiment of the present invention.
Figure 3:
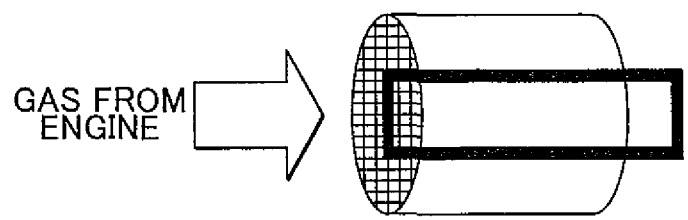
FIG. 3 is a schematic view of an exhaust gas purifying catalyst according to an embodiment of the present invention.

Description is hereinafter made of the present invention with reference to FIGS. 1 and 2 and FIGS. 4 to 8. As shown in FIG. 1, an exhaust gas purifying catalyst 1A of the present invention includes a substrate 2; and a catalyst layer 5A that is formed on the substrate 2 and contains a first oxygen storage material 3 on which no noble metal is supported and which has a pyrochlore phase type regular array structure, a second oxygen storage material 4 on which a platinum group noble metal is supported and which has higher oxygen storage rate and a lower oxygen storage capacity than the first oxygen storage material, and a carrier on which Rh is supported (not shown). As shown in FIG. 2, an exhaust gas purifying catalyst 1B of the present invention includes a substrate 2; a catalyst layer 5B that is formed on the substrate 2 and contains a first oxygen storage material 3 on which no noble metal is supported and which has a pyrochlore phase type regular array structure and a second oxygen storage material 4 on which a platinum group noble metal is supported and which has a higher oxygen storage rate and a lower oxygen storage capacity than the first oxygen storage material; and an Rh coat layer 6 that is formed over the catalyst layer 5B.

Figure 4:
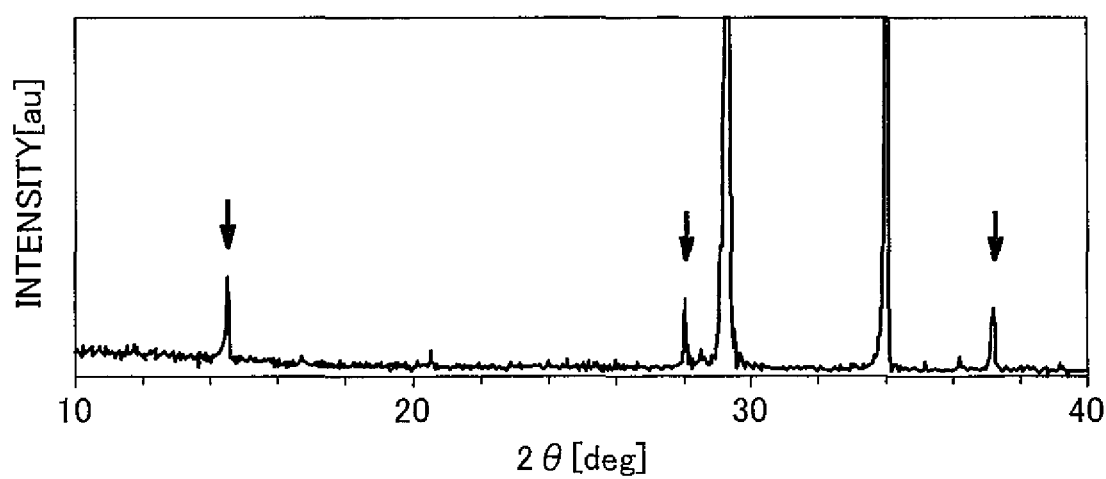
FIG. 4 is a graph that shows the X-ray diffraction pattern before endurance at 1000° C. of an oxygen storage material that has a pyrochlore phase type regular array structure according to the present invention.

As shown in FIG. 4, the oxygen storage material which has a pyrochlore phase type regular array structure for use in the present invention has three diffraction peaks that are derived from the pyrochlore phase in the X-ray diffraction pattern after endurance at 1000° C. under the conditions that are described in detail in the section of Examples below.

Figure 5:
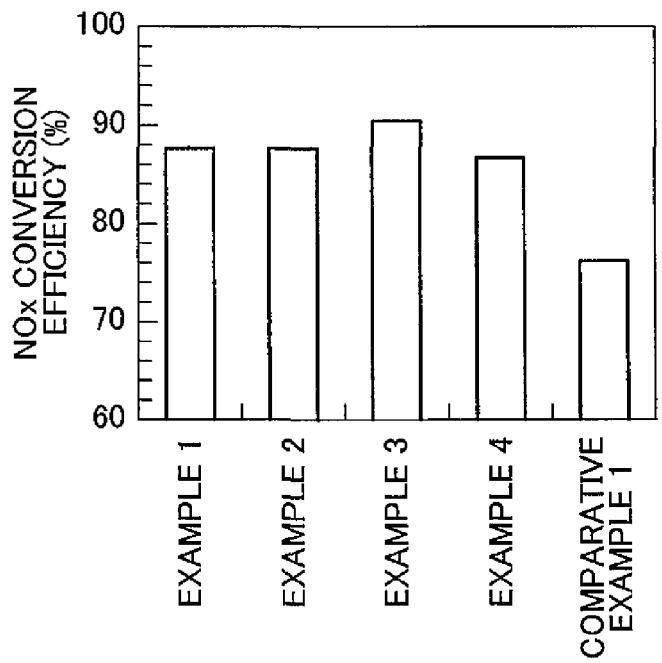
FIG. 5 is a graph that shows $NO_X$ conversion efficiencies of exhaust gas purifying catalysts of Examples and Comparative Example.

FIG. 5 indicates that the exhaust gas purifying catalysts according to the embodiments of the present invention have a higher $NO_X$ conversion efficiency after an endurance test than the exhaust gas purifying catalysts of Comparative Examples as measured by a method that is described in detail in the section of Examples below. In addition, FIG. 6 indicates that the exhaust gas purifying catalysts according to the embodiments of the present invention have a higher $NO_X$ conversion efficiency after an endurance test when the proportion of the first oxygen storage material to the total of the oxygen storage materials is greater than 4.5% by mass and not greater than 77% by mass than when the proportion is outside the above range.

Figure 7:
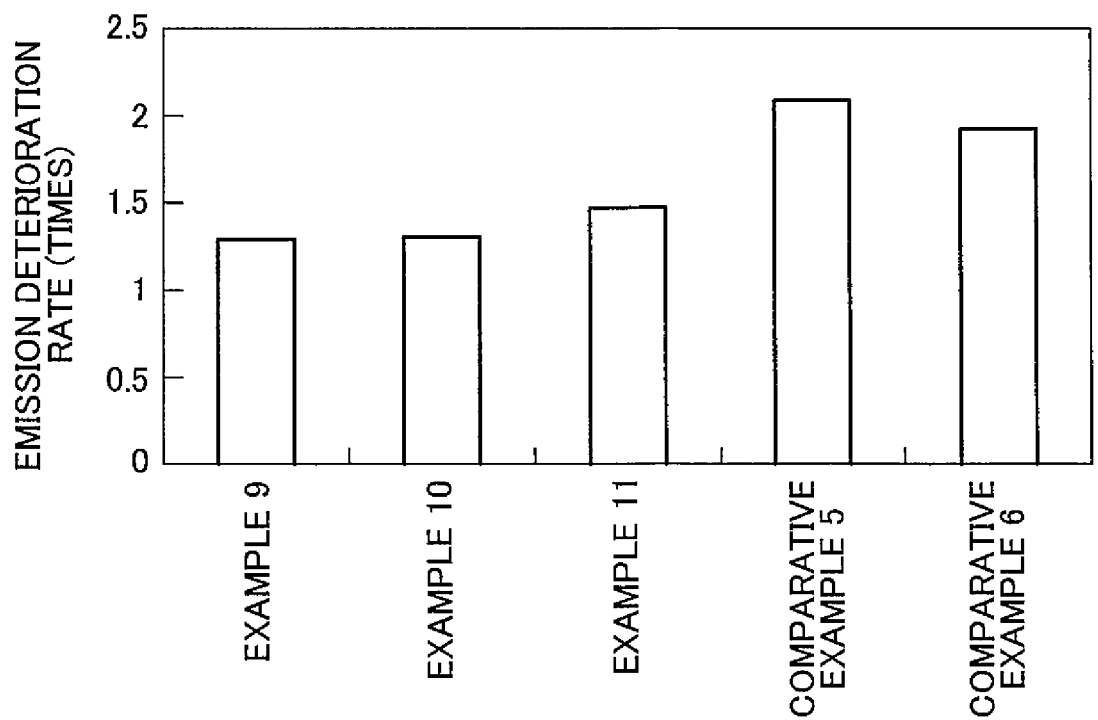
FIG. 7 is a graph that shows the emission deterioration rates of the exhaust gas purifying catalysts of Examples and Comparative Examples when exhaust gas that contained sulfur was used after an endurance test.
Figure 8:
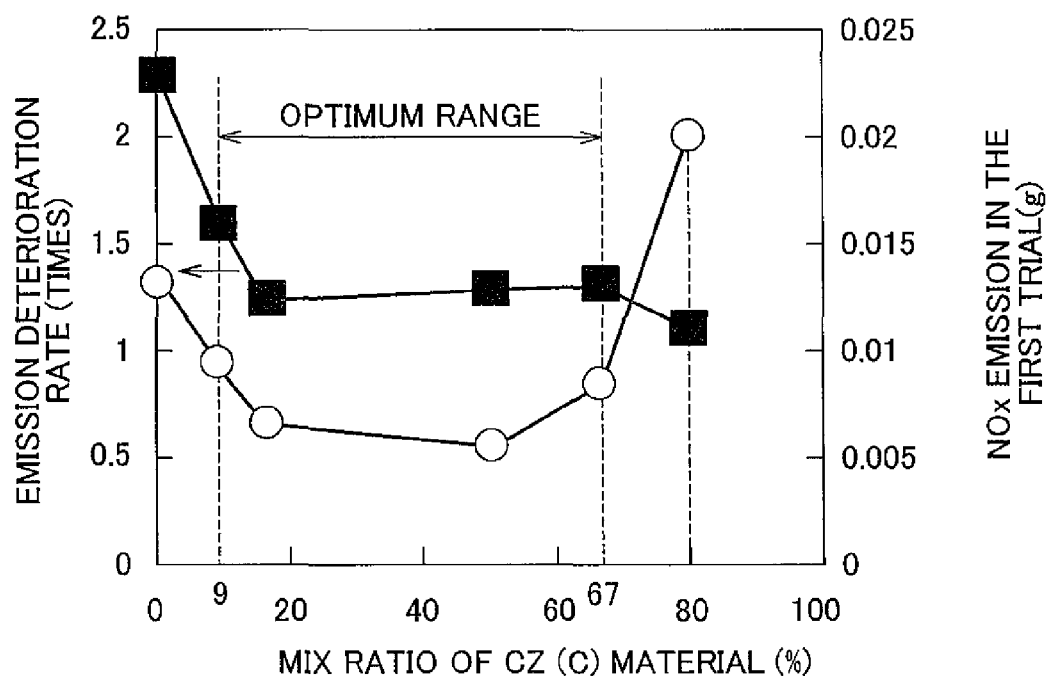
FIG. 8 is a graph that shows the relationship, in the exhaust gas purifying catalysts of Examples and Comparative Examples, between the proportion of the first oxygen storage material to the total of the oxygen storage materials and the $NO_X$ conversion efficiency when exhaust gas that contained sulfur was used after an endurance test.

FIG. 7 indicates that the exhaust gas purifying catalysts according to the embodiments of the present invention have a lower emission deterioration rate than the exhaust gas purifying catalysts of Comparative Examples as measured by a method using exhaust gas that contains sulfur after an endurance test, which is described in detail in the section of Examples below, and therefore have higher $NO_X$ purification performance than the exhaust gas purifying catalysts of Comparative Examples. In addition, FIG. 8 indicates that the exhaust gas purifying catalysts according to the embodiments of the present invention have a lower emission deterioration rate as measured by the method using exhaust gas that contains sulfur after an endurance test and therefore have higher $NO_X$ purification performance when the proportion of the first oxygen storage material to the total of the oxygen storage materials is greater than 9% by mass and not greater than 67% by mass than when the proportion is outside the above range.

Although the reason why the exhaust gas purifying catalyst of the present invention has high $NO_X$ purification performance on exhaust gas that contains sulfur when the proportion of the first oxygen storage material to the total of the oxygen storage materials is greater than 9% by mass and not greater than 67% by mass has not been proven theoretically, it is believed to be because the first oxygen storage material of the present invention, on which no noble metal is supported and which has a pyrochlore phase type regular array structure, can release a small amount of oxygen in a reducing atmosphere. In other words, it is believed that the exhaust gas purifying catalyst can exhibits its OSC capacity for a long period of time even in a prolonged rich exhaust gas condition because a decrease in activity that is caused by sulfur is suppressed as the sulfides that are formed on the noble metal in a reducing atmosphere is oxidized and removed by the oxygen that is released from the first oxygen storage material and because a pyrochlore phase that has a high oxygen occlusion capacity exists stably.

The exhaust gas purifying catalyst of the present invention is obtained by forming, on a substrate, a catalyst layer that contains a first oxygen storage material on which no noble metal is supported and which has a pyrochlore phase type regular array structure, a second oxygen storage material which has a higher oxygen storage rate and a lower oxygen storage capacity than the first oxygen storage material and on which a platinum group noble metal is supported, and a carrier on which Rh is supported. Alternatively, the exhaust gas purifying catalyst of the present invention is obtained by forming on a substrate a catalyst layer that contains a first oxygen storage material on which no noble metal is supported and which has a pyrochlore phase type regular array structure and a second oxygen storage material which has a higher oxygen storage rate and a lower oxygen storage capacity than the first oxygen storage material and on which a platinum group noble metal is supported, and by subsequently forming an Rh coat layer over the catalyst layer.

The substrate is formed of a ceramic material such as cordierite or a metal material such as stainless steel, for example. The substrate may be of any shape such as straight flow type or filter type, and the effects of the present invention can be produced irrespective of the shape of the substrate.

One example of an oxygen storage material that can be used as the first oxygen storage material which has a pyrochlore phase type regular array structure is a ceria-zirconia composite oxide which can be obtained by pressing a composite oxide powder which contains ceria and zirconia at a molar ratio ($CeO_2:ZrO_2$) of 55:45 to 43:57 and in which cerium ions and zirconium ions are uniformly mixed at the atomic level at a temperature between 1350° C. and 1900° C., both inclusive, particularly between 1700° C. and 1800° C., both inclusive, and a pressure of 50 MPa or higher and by subsequently performing a reduction treatment on the pressed product. In the present invention, it is necessary that no noble metal is supported on the first oxygen storage material which has a pyrochlore phase type regular array structure. When a noble metal is supported, no reduction in the amount of noble metal is achieved and the $NO_X$ purification effect per unit amount of noble metal rather decreases. In addition, an oxygen storage material that has a pyrochlore phase type regular array structure but loses the non-pyrochlore phase type structure after endurance is not suitable.

The platinum group metal is at least one of Ru (ruthenium), Rh, Pd, Os (osmium), Ir (iridium) and Pt, preferably Pt or Pd. Examples of an oxygen storage material that can be used as the second oxygen storage material which has a higher oxygen storage rate and a lower oxygen storage capacity than the first oxygen storage material include any Ce-containing oxides which do not have a pyrochlore phase type regular array structure. One example of the Ce-containing oxides is ceria ($CeO_2$). $CeO_2$ can be suitably used as a ceria composite oxide, such as a ceria-zirconia ($CeO_2$—$ZrO_2$) composite oxide (CZ). Here, the second oxygen storage material has a molar composition ratio of ceria to zirconia (Ce/Zr molar composition ratio) in the range of 1/9 to 9/1. Other examples of the ceria composite oxide include secondary particles of a solid solution of three elements Ce, Zr and O (oxygen), and secondary particles of a solid solution of four or more elements including the above three elements and a rare-earth element, such as Y (yttrium) or Nd (neodymium). The carrier is composed of at least one of $Al_2O_3$, $SiO_2$, $TiO_2$ and $ZrO_2$, preferably $ZrO_2$. When the catalyst layer is formed, an alumina binder may be used as a binder. The platinum group metal may be deposited on the second oxygen storage material under the same conditions as applied to an ordinary exhaust gas purifying catalyst. The amounts of the platinum group metal and Rh supported are both preferably 0.01 to 5.0 g/L, more preferably 0.1 to 2.0 g/L.

The exhaust gas purifying catalyst of the present invention, which has a configuration in which a first oxygen storage material on which no noble metal is supported and which has a pyrochlore phase type regular array structure is combined with a second oxygen storage material on which a platinum group noble metal is supported, can have high $NO_X$ purification performance. The exhaust gas purifying catalyst of the present invention may be used in combination with a member that has a different function, such as an HC purifying catalyst layer or CO oxidizing catalyst layer.

Examples of the present invention are described together with Comparative Examples below. The following examples are only for illustrative purpose, not for limiting the present invention. In each example below, the $NO_X$ conversion efficiency of the exhaust gas purifying catalyst was obtained in an endurance test and by catalyst evaluation methods that are described below. It is needless to say that the endurance test for exhaust gas purifying catalysts and the catalyst evaluation method are not limited to those that are shown below, and the exhaust gas purifying catalysts may be tested and evaluated by any method that is recognized as equivalent by those skilled in the art.

1) Catalyst Endurance Test

To check if the catalytic activity was maintained after a certain period of driving, an accelerated deterioration test (endurance test) was conducted using an actual engine. A ceramic mat was wound around the catalyst, and the catalyst was canned in an exhaust pipe. A thermocouple was inserted into the center of the honeycomb, and the exhaust pipe was attached to the engine. Then, the engine rotational speed/torque were adjusted so that the thermocouple indicated a temperature of 1000° C.±20° C. At this time, a cycle test in which the A/F was repeatedly changed between 14 and 15 at regular intervals was conducted. The endurance test time was 50 hours.

2-1) Catalyst Evaluation Using Exhaust Gas

The catalyst after the endurance test was attached to an engine for evaluation (2.5 L, NA), and the engine rotational speed/torque were adjusted so that the temperature at a position 10 mm upstream of the catalyst could be 600° C. The A/F of the catalyst incoming gas was changed between 14.2 and 15.0 at regular intervals and the $NO_X$ conversion efficiency was obtained from the amounts of gas discharged upstream and downstream of the catalyst.

$NO_X$ conversion efficiency(%)=(difference between the amounts of $NO_X$ into and out of catalyst)× 100/amount of $NO_X$ into catalyst 2-2) Catalyst Evaluation Using Exhaust Gas Derived from Fuel Containing Sulfur The catalyst after the endurance test was attached to an engine for evaluation (2.5 L, NA). The vehicle was driven on a part of a pattern similar to that for the FTP (Federal Test Procedure) mode (a driving test mode that is determined by the U.S. Environmental Protection Agency and used in evaluating the exhaust gas purification capacity), and the $NO_X$ conversion efficiency during the driving was measured. A test fuel that contained 35 ppm of sulfur was used as the fuel, and evaluation was repeated five times without any special purge conditions to investigate the influence of sulfur poisoning. The $NO_X$ conversion efficiency was defined as the rate of the amount of $NO_X$ discharged in the first trial to the amount of $NO_X$ discharged in the fifth trial. The catalyst performance without the influence of sulfur was evaluated based on the amount of $NO_X$ discharged in the first trial.

3) Specific Surface Area Measurement Method
BET method

4) Pd Particle Size Measurement Method
CO-pulse method, XRD

The composition of the CZ material that was used in each example below is shown. The CZ material (A) and CZ material (B) are commercialized products.

Supplier of CZ material (A): Rhodia
Supplier of CZ material (B): Rhodia

TABLE 1

| CZ material | Composition | | | | | Specific surface area |
|---|---|---|---|---|---|---|
| | $CeO_2$ | $ZrO_2$ | $La_2O_3$ | $Y_2O_3$ | $Pr_6O_{11}$ | $m^2/g$ |
| (A) | 30 | 60 | 5 | 5 | | 63 |
| (B) | 60 | 30 | 3 | | 7 | 45 |
| (C) | 58 | 42 | | | | 0.6 |

REFERENCE EXAMPLE 1

Preparation of CZ Material (C) Having Pyrochlore Phase Type Regular Structure

After 49.1 g of an aqueous cerium nitrate solution with a concentration of 28% by mass in terms of $CeO_2$, 54.7 g of an aqueous zirconium oxynitrate solution with a concentration of 18% by mass in terms of $ZrO_2$, and a commercially available surfactant were dissolved in 90 mL of ion exchanged water, an ammonia water with an $NH_3$ concentration of 25% by mass was added in an amount equivalent to 1.2 times the amount of negative ions to form a coprecipitate. The obtained coprecipitate was filtered and washed. Then, the coprecipitate was dried at 110° C. and calcined at 500° C. for 5 hours in the atmosphere to obtain a solid solution of cerium and zirconium. After that, the solid solution was pulverized in a pulverizer into particles with an average particle size of 1000 nm to obtain a ceria-zirconia solid solution powder that contained ceria and zirconia at a molar ratio ($CeO_2$:$ZrO_2$) of 50:50. Then, the ceria-zirconia solid solution powder was filled in a polyethylene bag. After the air in the bag was evacuated, the bag was thermally sealed. The ceria-zirconia solid solution powder was molded under a pressure of 300 MPa for one minute using a hydrostatic pressing machine to obtain a solid ceria-zirconia solid solution powder precursor. The obtained solid precursor was put into a graphite crucible with a graphite lid, and reduced at 1700° C. for 5 hours in an Ar (argon) gas. The sample after reduction was pulverized in a pulverizer to obtain a powder (C) with an average particle size of approximately 5 μm.

EXAMPLE 1

A rhodium nitrate solution was deposited on a commercially available zirconia powder by impregnation, and the zirconia powder was dried and calcined to prepare an Rh-supporting powder (E). A palladium nitrate solution was deposited on the powder (A) by impregnation, and the powder (A) was dried and calcined to prepare a Pd-supporting powder (A'). A powder mixture of 50 g of the powder (A'), 30 g of the powder (E), 20 g of a commercially available alumina and 50 g of the powder (C) was mixed with an alumina binder at a mass ratio of 20:1, and water was added to the mixture to prepare a coating slurry (1). The slurry (1) was poured into a honeycomb substrate (600-cell, wall thickness: 3 mil, f 103× L105) from above and sucked from the underside of the honeycomb substrate to coat the honeycomb substrate with the slurry (1). Then, the honeycomb substrate was dried and calcined. At this time, the amount and solid content of the slurry introduced and the suction conditions were adjusted so that the slurry could reach the central portion of the honeycomb substrate. Then, the slurry (1) was poured through the end opposite the end through which the slurry was poured in the first coating process and the same sucking procedure as in the first coating process was performed so that the slurry could reach the central portion of the honeycomb substrate. The honeycomb substrate was then dried and calcined. The coating amount was adjusted so that the resulting coat layer after the calcination had a mass of 150 g/L. The supported amounts were Pd/Rh=1.0/0.2 [g/L]. The performance of the obtained exhaust gas purifying catalyst was evaluated by the catalyst evaluation method 2-1). The results are summarized in FIG. 5 and FIG. 6 together with other results. The Pd particle size in the exhaust gas purifying catalyst after endurance was measured. The results are summarized in Table 2 together with other results. The result is shown in Table 2 together with other results.

EXAMPLE 2

An exhaust gas purifying catalyst was obtained in the same manner as in Example 1 except that the powder (B) was used in place of the powder (A). An endurance test and performance evaluation were conducted on the obtained exhaust gas purifying catalyst. The results are summarized in FIG. 5 together with other results.

EXAMPLE 3

A powder mixture of 25 g of the powder (A'), 22.5 g of the powder (E), 15 g of the alumina and 50 g of the powder (C) was mixed with the alumina binder at a mass ratio of 20:1, and water is added to the mixture to prepare a coating slurry (2). A powder mixture of 25 g of the powder (A'), 7.5 g of the powder (E) and 5 g of the alumina was mixed with the alumina binder at a mass ratio of 20:1, and water is added to the mixture to prepare a coating slurry (3). The slurry (2) was poured into the honeycomb substrate and sucked from the underside of the honeycomb substrate to coat the honeycomb substrate with the slurry (2). Then, the honeycomb substrate was dried and calcined. At this time, the amount and solid content of the slurry introduced and the suction conditions were adjusted so that the slurry could reach the central portion of the honeycomb substrate. Then, the slurry (2) was poured through the end opposite the end through which the slurry was poured in the first coating process and the same sucking procedure as in the first coating process was performed so that the slurry could reach the central portion of the honeycomb substrate. The honeycomb substrate was then dried and calcined. Next, the slurry (3) was coated over the coat layer that was formed as a result of the first and second coating processes. The honeycomb substrate was then dried and calcined to obtain a two-layered exhaust gas purifying catalyst. The coating amount was adjusted so that the resulting coat layer after the calcination had a mass of 150 g/L. The supported amounts were Pd/Rh=1.0/0.2 [g/L]. An endurance test and performance evaluation were conducted on the obtained exhaust gas purifying catalyst. The results are summarized in FIG. 5 together with other results.

EXAMPLE 4

An exhaust gas purifying catalyst was obtained in the same manner as in Example 3 except that the slurry (3) was used to form the lower layer and the slurry (2) was used to form the upper layer. An endurance test and performance evaluation were conducted on the obtained exhaust gas purifying catalyst. The results are summarized in FIG. 5 together with other results.

COMPARATIVE EXAMPLE 1

A palladium nitrate solution was deposited on the powder (C) by impregnation, and the powder (C) was dried and calcined to prepare a Pd-supporting powder (C'). A powder mixture of 50 g of the powder (A'), 50 g of the powder (C'), 20 g of the alumina and 30 g of the powder (E) was mixed with the alumina binder at a mass ratio of 20:1, and water was added to the mixture to prepare a coating slurry (4). A honeycomb substrate was coated with the slurry (4) in the same manner as in Example 1 to obtain an exhaust gas purifying catalyst. The coating amount was adjusted so that the resulting coat layer after the calcination had a mass of 150 g/L. The supported amounts were Pd/Rh=1.0/0.2 [g/L]. An endurance test and performance evaluation were conducted on the obtained exhaust gas purifying catalyst. The results are summarized in FIG. 5 together with other results. The Pd particle size in the exhaust gas purifying catalyst after endurance was measured. The results are summarized in Table 2 together with other results.

TABLE 2

|  | Pd particle size (nm) |
|---|---|
| Example 1 | 62.1 |
| Comparative Example 1 | 190 |

EXAMPLE 5

A powder mixture of 100 g of the powder (A'), 5 g of the powder (C), 30 g of the powder (E) and 20 g of the alumina was mixed with the alumina binder at a mass ratio of 20:1, and water was added to the mixture to prepare a coating slurry (5). A honeycomb substrate was coated with the slurry (5) in the same manner as in Example 1 to obtain an exhaust gas purifying catalyst. The coating amount was adjusted so that the resulting coat layer after the calcination had a mass of 155 g/L. The supported amounts were Pd/Rh=1.0/0.2 [g/L]. An endurance test and performance evaluation were conducted on the obtained exhaust gas purifying catalyst. The results are summarized in FIG. 6 together with other results.

EXAMPLE 6

A powder mixture of 100 g of the powder (A'), 25 g of the powder (C), 30 g of the powder (E) and 20 g of the alumina was mixed with the alumina binder at a mass ratio of 20:1, and water was added to the mixture to prepare a coating slurry (6). A honeycomb substrate was coated with the slurry (6) in the same manner as in Example 1 to obtain an exhaust gas purifying catalyst. The coating amount was adjusted so that the resulting coat layer after the calcination had a mass of 175 g/L. The supported amounts were Pd/Rh=1.0/0.2 [g/L]. An endurance test and performance evaluation were conducted on the obtained exhaust gas purifying catalyst. The results are summarized in FIG. 6 together with other results.

EXAMPLE 7

A powder mixture of 50 g of the powder (A'), 100 g of the powder (C), 30 g of the powder (E) and 20 g of the alumina was mixed with the alumina binder at a mass ratio of 20:1, and water was added to the mixture to prepare a coating slurry (7). A honeycomb substrate was coated with the slurry (7) in the same manner as in Example 1 to obtain an exhaust gas purifying catalyst. The coating amount was adjusted so that the resulting coat layer after the calcination had a mass of 200 g/L. The supported amounts were Pd/Rh=1.0/0.2 [g/L]. An endurance test and performance evaluation were conducted on the obtained exhaust gas purifying catalyst. The results are summarized in FIG. 6 together with other results.

EXAMPLE 8

A powder mixture of 30 g of the powder (A'), 100 g of the powder (C), 30 g of the powder (E) and 20 g of the alumina was mixed with the alumina binder at a mass ratio of 20:1, and water was added to the mixture to prepare a coating slurry (8). A honeycomb substrate was coated with the slurry (8) in the same manner as in Example 1 to obtain an exhaust gas purifying catalyst. The coating amount was adjusted so that the resulting coat layer after the calcination had a mass of 180 g/L. The supported amounts were Pd/Rh=1.0/0.2 [g/L]. An endurance test and performance evaluation were conducted on the obtained exhaust gas purifying catalyst. The results are summarized in FIG. 6 together with other results.

COMPARATIVE EXAMPLE 2

A powder mixture of 100 g of the powder (A'), 0 g of the powder (C), 30 g of the powder (E) and 20 g of the alumina was mixed with the alumina binder at a mass ratio of 20:1, and water was added to the mixture to prepare a coating slurry (9). A honeycomb substrate was coated with the slurry (9) in the same manner as in Example 1 to obtain an exhaust gas purifying catalyst. The coating amount was adjusted so that the resulting coat layer after the calcination had a mass of 150 g/L. The supported amounts were Pd/Rh=1.0/0.2 [g/L]. An endurance test and performance evaluation were conducted on the obtained exhaust gas purifying catalyst. The results are summarized in FIG. 6 together with other results.

COMPARATIVE EXAMPLE 3

A powder mixture of 100 g of the powder (A'), 2.5 g of the powder (C), 30 g of the powder (E) and 20 g of the alumina was mixed with the alumina binder at a mass ratio of 20:1, and water was added to the mixture to prepare a coating slurry (10). A honeycomb substrate was coated with the slurry (10) in the same manner as in Example 1 to obtain an exhaust gas purifying catalyst. The coating amount was adjusted so that the resulting coat layer after the calcination had a mass of 152.5 g/L. The supported amounts were Pd/Rh=1.0/0.2 [g/L]. An endurance test and performance evaluation were conducted on the obtained exhaust gas purifying catalyst. The results are summarized in FIG. 6 together with other results.

COMPARATIVE EXAMPLE 4

A powder mixture of 15 g of the powder (A'), 100 g of the powder (C), 30 g of the powder (E) and 20 g of the alumina was mixed with an alumina binder at a mass ratio of 20:1, and water was added to the mixture to prepare a coating slurry (11). A honeycomb substrate was coated with the slurry (11) in the same manner as in Example 1 to obtain an exhaust gas purifying catalyst. The coating amount was adjusted so that the resulting coat layer after the calcination had a mass of 165 g/L. The supported amounts were Pd/Rh=1.0/0.2 [g/L]. An endurance test and performance evaluation were conducted on the obtained exhaust gas purifying catalyst. The results are summarized in FIG. 6 together with other results.

Figure 6:
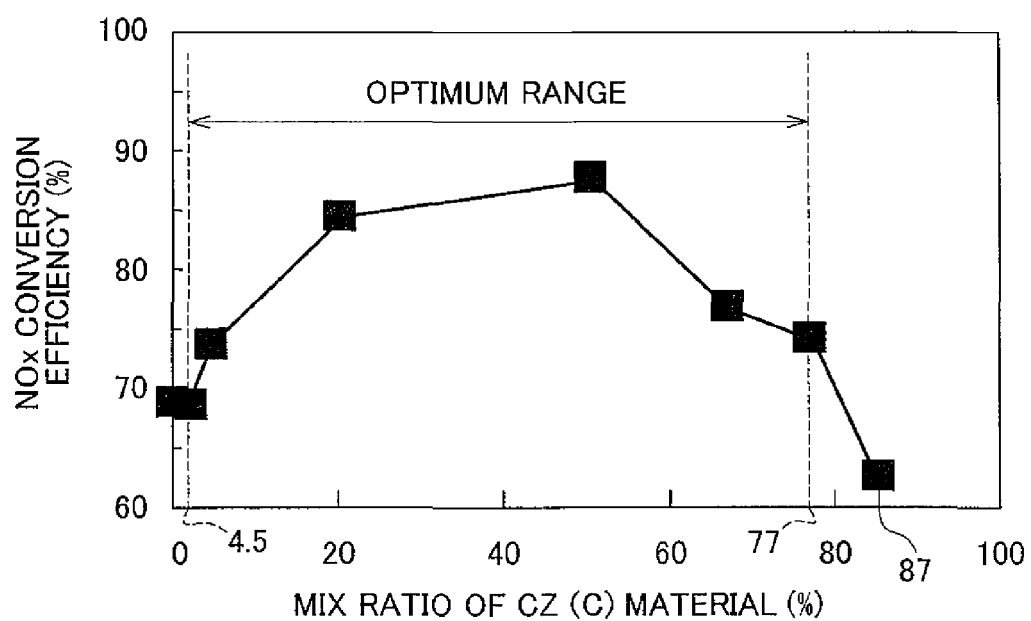
FIG. 6 is a graph that shows the relationship, in the exhaust gas purifying catalysts of Examples and Comparative Examples, between the proportion of the first oxygen storage material to the total of the oxygen storage materials and the $NO_X$ conversion efficiency after an endurance test.

Table 2 indicates that growth of noble metal particles was suppressed in the exhaust gas purifying catalyst of Example 1. FIG. 2 indicates that growth of noble metal particles in the exhaust gas purifying catalyst of Comparative Example 1, in which a noble metal was directly supported on the first oxygen storage material, decreases the $NO_X$ purification performance of the exhaust gas purifying catalyst. Also, the catalyst of the example that is shown in FIG. 2 improved the $NO_X$ purifying activity because of its high OSC capacity even when the A/F fluctuated significantly. Comparison between Example 1 and Example 2 indicates that the second oxygen storage material on which a noble metal is supported may have either of a ceria-rich composition and a zirconia-rich composition and there is no limitation in this respect. In addition, it was proven that the first oxygen storage material on which no noble metal is supported is required to be present at least in the same layer as the second oxygen storage material on which a noble metal is supported, and the layer is not limited to the upper layer or the lower layer. FIG. 6 indicates that the mass ratio of the OSC material on which no noble metal is supported to the total of the OSC materials in the catalyst is preferably greater than 4.5% and not greater than 77%.

EXAMPLE 9

A rhodium nitrate solution was deposited on a commercially available zirconia powder by impregnation. The zirconia powder was then mixed with the alumina binder at a mass ratio of 1:20, and water was added to the mixture to prepare a coating slurry (12). A powder mixture of 50 g of the powder (A'), 10 g of a commercially available alumina and 50 g of the powder (C) was mixed with the alumina binder at a mass ratio of 20:1, and water was added to the mixture to prepare a coating slurry (13). The slurry (13) was poured into a honeycomb substrate (600-cell, wall thickness: 3 mil, f 103×L105) from above and sucked from the underside of the honeycomb substrate to coat the honeycomb substrate with the slurry (1). Then, the honeycomb substrate was dried and calcined. At this time, the amount and solid content of the slurry introduced and the suction conditions were adjusted so that the slurry could reach the central portion of the honeycomb substrate. Then, the slurry (13) was poured through the end opposite the end through which the slurry was poured in the first coating process and the same sucking procedure as in the first coating process was performed so that the slurry could reach the central portion of the honeycomb substrate. The honeycomb substrate was then dried and calcined. Next, the slurry (12) was coated over the coat layer that was formed as a result of the first and second coating processes. The honeycomb substrate was then dried and calcined to obtain a two-layered exhaust gas purifying catalyst. The coating amount was adjusted so that the resulting coat layer after the calcination had a mass of 200 g/L. The supported amounts were Pd/Rh=1.0/0.2 [g/L]. The performance of the obtained exhaust gas purifying catalyst was evaluated by the catalyst evaluation method 2-2). The results are summarized in Table 3, Table 4, FIG. 7 and FIG. 8 together with other results.

EXAMPLE 10

An exhaust gas purifying catalyst was obtained in the same manner as in Example 9 except that the powder (B) was used in place of the powder (A). An endurance test and performance evaluation were conducted on the obtained exhaust gas purifying catalyst. The results are summarized in Table 3 and FIG. 7 together with other results.

EXAMPLE 11

A powder mixture of 50 g of the powder (A') and 10 g of the alumina was mixed with the alumina binder at a mass ratio of 1:20, and water was added to the mixture to prepare a coating slurry (14). A powder mixture of 50 g of the powder (C) and 10 g of the alumina was mixed with the alumina binder at a mass ratio of 1:20, and water was added to the mixture to prepare a coating slurry (15). The slurry (15) was poured into the honeycomb substrate and sucked from the underside of the honeycomb substrate. Then, the honeycomb substrate was dried and calcined to coat the honeycomb substrate uniformly with a powder (C) coat layer. The slurry (14) was coated over the powder (C) coat layer that was formed in the first coating process, and the honeycomb substrate was dried and calcined to form a powder (A') coat layer over the powder (C) coat layer. Then, the slurry (12) was coated over the coat layers that were formed in the first and second coating processes, and the honeycomb substrate was dried and calcined to form a coat layer that had a three-layer structure. The coating amount was the same as that in Example 9. An endurance test and performance evaluation were conducted on the obtained exhaust gas purifying catalyst. The results are summarized in Table 3 and FIG. 7 together with other results.

EXAMPLE 12

A powder mixture of 50 g of the powder (A'), 5 g of the powder (C) and 10 g of the alumina was mixed with the alumina binder at a mass ratio of 20:1, and water was added to the mixture to prepare a coating slurry (16). An exhaust gas purifying catalyst was obtained in the same manner as in Example 9 except that the slurry (16) was used in place of the slurry (13). An endurance test and performance evaluation were conducted on the obtained exhaust gas purifying catalyst. The results are summarized in Table 4 and FIG. 8 together with other results.

EXAMPLE 13

A powder mixture of 50 g of the powder (A'), 10 g of the powder (C) and 10 g of the alumina was mixed with the alumina binder at a mass ratio of 20:1, and water was added to the mixture to prepare a coating slurry (17). An exhaust gas purifying catalyst was obtained in the same manner as in Example 9 except that the slurry (17) was used in place of the slurry (13). An endurance test and performance evaluation were conducted on the obtained exhaust gas purifying catalyst. The results are summarized in Table 4 and FIG. 8 together with other results.

EXAMPLE 14

A powder mixture of 50 g of the powder (A'), 100 g of the powder (C) and 10 g of the alumina was mixed with the alumina binder at a mass ratio of 20:1, and water was added to the mixture to prepare a coating slurry (18). An exhaust gas purifying catalyst was obtained in the same manner as in Example 9 except that the slurry (18) was used in place of the slurry (13). An endurance test and performance evaluation were conducted on the obtained exhaust gas purifying catalyst. The results are summarized in Table 4 and FIG. 8 together with other results.

COMPARATIVE EXAMPLE 5

A palladium nitrate solution was deposited on the powder (B) by impregnation, and the powder (B) was dried and calcined to prepare a Pd-supporting powder (B'). A powder mixture of 50 g of the powder (A'), 50 g of the powder (B') and 10 g of the alumina was mixed with the alumina binder at a mass ratio of 20:1, and water was added to the mixture to prepare a coating slurry (19). An exhaust gas purifying catalyst was obtained in the same manner as in Example 9 except that the slurry (19) was used in place of the slurry (13). An endurance test and performance evaluation were conducted on the obtained exhaust gas purifying catalyst. The results are summarized in Table 3 and FIG. 7 together with other results.

COMPARATIVE EXAMPLE 6

A coating slurry (20) was prepared in the same manner as that in which the slurry (13) of Example 9 was prepared except that the powder (B) was used in place of powder (C). An exhaust gas purifying catalyst was obtained in the same manner as in Example 9 except that the slurry (20) was used in place of the slurry (13). An endurance test and performance evaluation were conducted on the obtained exhaust gas purifying catalyst. The results are summarized in Table 3 and FIG. 7 together with other results.

COMPARATIVE EXAMPLE 7

A powder mixture of 50 g of the powder (A') and 10 g of the alumina was mixed with the alumina binder at a mass ratio of 20:1, and water was added to the mixture to prepare a coating slurry (21). An exhaust gas purifying catalyst was obtained in the same manner as in Example 9 except that the slurry (21) was used in place of the slurry (13). An endurance test and performance evaluation were conducted on the obtained exhaust gas purifying catalyst. The results are summarized in Table 4 and FIG. 8 together with other results.

COMPARATIVE EXAMPLE 8

A powder mixture of 50 g of the powder (A'), 200 g of the powder (C) and 10 g of the alumina was mixed with the alumina binder at a mass ratio of 20:1, and water was added to the mixture to prepare a coating slurry (22). An exhaust gas purifying catalyst was obtained in the same manner as in Example 9 except that the slurry (22) was used in place of the slurry (13). An endurance test and performance evaluation were conducted on the obtained exhaust gas purifying catalyst. The results are summarized in Table 4 and FIG. 8 together with other results.

TABLE 3

|  | Emission deterioration rate | Amount of $NO_X$ discharged in first trial (g) |
|---|---|---|
| Example 9 | 1.28 | 0.005 |
| Example 10 | 1.30 | 0.008 |
| Example 11 | 1.48 | 0.010 |
| Comparative Example 5 | 2.10 | 0.012 |
| Comparative Example 6 | 1.95 | 0.009 |

TABLE 4

|  | Proportion of powder (C) added (%) | Emission deterioration rate | Amount of $NO_X$ discharged in first trial (g) |
|---|---|---|---|
| Comparative Example 7 | 0.0 | 2.28 | 0.013 |
| Example 12 | 9.1 | 1.60 | 0.009 |
| Example 13 | 16.7 | 1.23 | 0.007 |
| Example 9 | 50.0 | 1.28 | 0.005 |
| Example 14 | 66.7 | 1.30 | 0.008 |
| Comparative Example 8 | 80.0 | 1.10 | 0.020 |

Table 3 and FIG. 7 indicate that the exhaust gas purifying catalysts of Examples showed less emission deterioration even after the repetitive evaluations and had a high level of $NO_X$ purification performance even when sulfur coexisted. The results of Example 9 and Example 10 indicate that the mixing of a CZ material on which no noble metal is supported and which has a pyrochlore phase can prevent emission deterioration that is caused by sulfur poisoning. In addition, the result of Example 11 indicates that the addition of the CZ material only in the lower layer is also effective. It is believed that sulfur poisoning of the noble metal can be suppressed for a long period of time because the pyrochlore phase exists stably in the CZ material on which no noble metal is supported and therefore the OSC capacity can be maintained for a long period of time even in a rich atmosphere. From the foregoing analysis, as an optimum range in which the exhaust gas purifying catalyst has both good sulfur tolerance and high $NO_X$ purification performance when sulfur coexists, it is preferred that the CZ material on which no noble metal is supported and which has a pyrochlore phase is mixed in an amount of 9 to 67% by mass based on the total of the CZ material and other CZ materials.

According to the present invention, it is possible to obtain an exhaust gas purifying catalyst which has high $NO_X$ purification performance.

While the invention has been described with reference to example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. An exhaust gas purifying catalyst, comprising:
a first oxygen storage material on which no noble metal is supported and which has a pyrochlore phase type regular array structure; and
a second oxygen storage material which has a higher oxygen storage rate and a lower oxygen storage capacity than the first oxygen storage material,
wherein a platinum group noble metal is supported on the second oxygen storage material,
wherein a proportion of the first oxygen storage material to the total of the oxygen storage materials is greater than 4.5% by mass and not greater than 77% by mass.

2. The exhaust gas purifying catalyst according to claim 1, wherein the second oxygen storage material has a Ce/Zr composition ratio (molar ratio) in the range of 1/9 to 9/1.

3. The exhaust gas purifying catalyst according to claim 1, wherein the first oxygen storage material is present in the same coat layer as the second oxygen storage material on which a noble metal is supported.

4. An exhaust gas purifying catalyst, comprising:
a first oxygen storage material on which no noble metal is supported and which has a pyrochlore phase type regular array structure; and
a second oxygen storage material which has a higher oxygen storage rate and a lower oxygen storage capacity than the first oxygen storage material,
wherein a platinum group noble metal is supported on the second oxygen storage material
wherein the proportion of the first oxygen storage material to the total of the oxygen storage materials is greater than 9% by mass and not greater than 67% by mass.

5. The exhaust gas purifying catalyst according to claim 4, wherein the first oxygen storage material is present in the same coat layer as the second oxygen storage material on which a noble metal is supported.

6. The exhaust gas purifying catalyst according to claim 4, wherein the second oxygen storage material on which a noble metal is supported is present in a region that is closer to the surface of a coat layer than the first oxygen storage material.

7. The exhaust gas purifying catalyst according to claim 1, wherein the platinum group noble metal is Pt or Pd.

8. The exhaust gas purifying catalyst according to claim 1, further comprising an alumina ($Al_2O_3$) on which no noble metal is supported.

9. The exhaust gas purifying catalyst according to claim 1, further comprising an Rh coat layer that covers a catalyst layer which contains the first oxygen storage material and the second oxygen storage material.

10. An exhaust gas purifying catalyst, comprising:
a catalyst layer,
wherein the catalyst layer contains
a first oxygen storage material on which no noble metal is supported and which has a pyrochlore phase type regular array structure; and
a second oxygen storage material which has a higher oxygen storage rate and a lower oxygen storage capacity than the first oxygen storage material and on which a platinum group noble metal is supported,
wherein a proportion of the first oxygen storage material to the total of the oxygen storage materials is greater than 4.5% by mass and not greater than 77% by mass.

11. The exhaust gas purifying catalyst according to claim 10, wherein the catalyst layer further contains an alumina on which no noble metal is supported.

* * * * *